(12) United States Patent
Sampson et al.

(10) Patent No.: US 6,508,520 B2
(45) Date of Patent: Jan. 21, 2003

(54) SYSTEM AND METHOD OF RETAINING A COMPONENT IN A HYDRAULIC CONTROL UNIT HOUSING

(75) Inventors: Ivan U. Sampson, Dayton, OH (US); Sara J. Bond, Centerville, OH (US); John A. Guernsey, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/812,648

(22) Filed: Mar. 20, 2001

(65) Prior Publication Data

US 2002/0135227 A1 Sep. 26, 2002

(51) Int. Cl.⁷ .............................................. B60T 17/08
(52) U.S. Cl. .................. 303/113.1; 303/87; 138/89; 29/505; 29/516; 403/274; 92/128
(58) Field of Search ................ 138/30, 31, 26, 138/89, 96 R; 220/721, 720; 417/540; 303/87, 115.1–115.5, DIG. 10, DIG. 11, 116.1, 116.2, 113.1, 119.2, 119.3; 137/568; 277/70, 71; 92/171.1, 128; 60/413; 29/523, 509; 285/215, 328.5, 382.7, 901

(56) References Cited

U.S. PATENT DOCUMENTS

| | | | | |
|---|---|---|---|---|
| 3,848,325 | A | * 11/1974 | Bimba ......................... | 29/516 |
| 3,909,920 | A | * 10/1975 | Cornish et al. ............. | 29/522.1 |
| 4,087,897 | A | * 5/1978 | Scholefield .................. | 29/509 |
| 5,102,311 | A | 4/1992 | Lambeck | |
| 5,219,000 | A | 6/1993 | Chalasani et al. | |
| 5,620,028 | A | 4/1997 | Johnston et al. | |
| 5,921,636 | A | 7/1999 | Roberts | |
| 5,967,625 | A | 10/1999 | Reuter et al. | |
| 6,203,117 | B1 | * 3/2001 | Starr et al. ..................... | 303/87 |
| 6,213,566 | B1 | * 4/2001 | Diaz | |
| 6,302,663 | B1 | * 10/2001 | Schuller et al. ............. | 417/470 |

* cited by examiner

Primary Examiner—Douglas C. Butler
(74) Attorney, Agent, or Firm—Scott A. McBain

(57) ABSTRACT

A system, device, and method for retaining a component within a hydraulic control unit of a vehicular braking system. The system comprises a housing and a component wherein the housing includes an angled lead in formed in an opening of the housing and an outer retaining portion. The component includes an inner portion that is angled to contact the angled lead in at a single point. The component includes an outer portion to contact the retaining portion of the housing when deformed. A deformed portion of the housing retains a device, such as the component.

20 Claims, 4 Drawing Sheets

SYSTEM AND METHOD OF RETAINING A COMPONENT IN A HYDRAULIC CONTROL UNIT HOUSING

TECHNICAL FIELD

The present invention relates to retaining components in a housing. In particular, the invention is directed to a system, such as a hydraulic control unit, wherein an attenuator cap is contained within an opening of the unit housing by seating the cap against an angled stop in the bore of the unit and deforming a portion of the housing over the cap.

BACKGROUND OF THE INVENTION

A hydraulic control unit of a vehicle braking system typically includes a number of devices that cooperate to control fluid pressure in a vehicular braking system, and in particular in an anti-lock braking system. Many of the devices, which include solenoids, valves, pumps, attenuators, and so on, are housed in a central unit hydraulic housing.

A hydraulic control unit includes a body or housing having bores for mounting various components therein as well as channels for directing fluid. For example, an attenuator is mounted in a bore in the hydraulic control unit. The use of attenuators that reduce the amplitude of pressure fluctuations in hydraulic fluid lines of vehicular braking system is well known. In particular, attenuators are common in vehicular anti-lock braking system (ABS) at the outlet end of an ABS hydraulic pump used to generate supplemental brake fluid pressure.

Generally, shown in FIG. 1, a prior art system of retaining a component, an attenuator cap, in a hydraulic control unit housing 8 is shown. An isolated bore 12 is shown which can be one of a plurality of bores in the unit. The attenuator cap 10 and bore 12 together define a chamber 14 with a predetermined volume that allows compression of brake fluid in the chamber 14. This significantly reduces the amplitude of high-energy pressure pulses in the brake fluid at the outlet of the pump (not shown). Such devices require an effective means for accurately positioning and retaining the cap 10, and therefore the pressure pulses produced within the bore.

Conventional attenuator caps 10 and similar components that are mounted in a hydraulic control unit are typically positioned in the bore 12 by some form of a positive stop 16. The positive stop 16, which is typically an annular, radially extending land with a face 18 at right angles to the axial direction, cooperates with a radial shoulder or face of the component 10 to seat the component 10 in the bore 12. A staking process can be used to retain the component in the housing 8 by deforming adjacent housing material 22, and closing the diameter of the bore, after the component is positioned within the housing. In the alternate, a circular clip, snap clip or circlip (not shown) retains the component 10. In part, due to the necessity of forming the positive stop 16, the larger diameter countersunk portion 17 of the bore, is necessary. This large diameter portion 17 requires a relatively large amount of space between components, and thus, a relatively large housing. In the case of the use of a threaded attachment or retainer ring, the requirement of machining threaded portion or an additional groove is an additional disadvantage.

In other prior art modulator units an angled seat is provided instead of a positive stop. However, the angled seat is provided to prevent nip of an O-ring seal positioned between the angled seat and a radial shoulder of the component. Importantly, the presence of an O-ring between the component and the unit housing does not allow the component to be staked in place. In this case, the component must be secured in the housing of the unit by other means, for example, by a machined threaded connection, or a press-fit, which may be less suitable for sealing of a high-pressure chamber like that of an attenuator.

Therefore, it would be desirable to retain and seal a component within an opening of a device, such as a hydraulic control unit, wherein the component is contoured to be seated and retained in such a manner as to eliminate the need for a retaining clip, require less parts and machining, optimize fluid volume chamber in the attenuator while maintaining minimal external packaging requirements, and simplify the bore design.

SUMMARY OF THE INVENTION

One aspect of the invention provides a system for retaining a component in a hydraulic control unit that includes a housing with an opening formed therein and a retaining portion adjacent the opening. The housing has an angled region formed within a bore of the opening and a component including an inner portion formed to contact the angled region at a single point and an outer portion to contact the retaining portion of the housing when the retaining portion is deformed over the outer portion.

Other aspects of the present invention provide a system wherein at least half of the outer portion is in direct contact with the retaining portion of the housing when the retaining portion is deformed. A peripheral groove can be formed on the component adapted to receive an O-ring. The inner portion of the component can be formed at an angle between about 25 to 35 degrees. The outer portion of the component can be formed at an angle between about 35 to 55 degrees.

Another aspect of the present invention provides a device for retaining pressurized fluid within a hydraulic control unit comprising a body portion, an inner portion contoured to contact an angled potion of the hydraulic control unit at a single point and an outer portion contoured to contact an integral retaining portion of the hydraulic control unit. The device can include at least half of the outer portion being in direct contact with the integral retaining portion of the hydraulic control unit. A groove can be formed about the periphery of the body portion, the groove adapted to receive an O-ring. The inner portion of the component can be formed at an angle between about 25 to 35 degrees. The outer portion of the component can be formed at an angle between about 35 to 55 degrees.

Another aspect of the present invention provides a method of retaining a component within a hydraulic control unit including inserting a component into an opening of the hydraulic control unit, contacting an inner portion of a component to an angled region of the hydraulic control unit at a single point, deforming a retaining portion of the hydraulic control unit and contacting an outer portion of the component with the retaining portion of the hydraulic control unit.

Other aspects of the method of the present invention include inserting the component into the opening of the hydraulic control unit, which includes an angled lead-in to orient the component in relation to the opening at a predetermined stack height. Contacting the inner portion of the component to the stop region of the hydraulic control unit can include preventing the component from positioning further within the hydraulic control unit. Deforming the retaining portion of the hydraulic control unit can include compressing a portion of the hydraulic control unit. Contacting an outer portion of the component with the retaining portion of the hydraulic control unit can include staking a portion of the hydraulic control unit in order to secure the component.

Another aspect of the present invention provides a system for retaining a component including means for inserting a component into an opening of the hydraulic control unit, means for contacting an inner portion of a component to an angled region of the hydraulic control unit at a single point, means for deforming a retaining portion of the hydraulic control unit to contact an outer portion of the component with the retaining portion of the hydraulic control unit. The system can include means for inserting the component into the opening of the hydraulic control unit including an angled lead-in to orient the component in relation to the opening at a predetermined stack height. The system can include means for contacting the inner portion of the component to the stop region of the hydraulic control unit that includes preventing the component from positioning further within the hydraulic control unit. The system can include means for deforming the retaining portion of the hydraulic control unit that includes compressing a portion of the hydraulic control unit. The system can include means for contacting an outer portion of the component with the retaining portion of the hydraulic control unit that includes staking a portion of the hydraulic control unit in order to secure the component.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
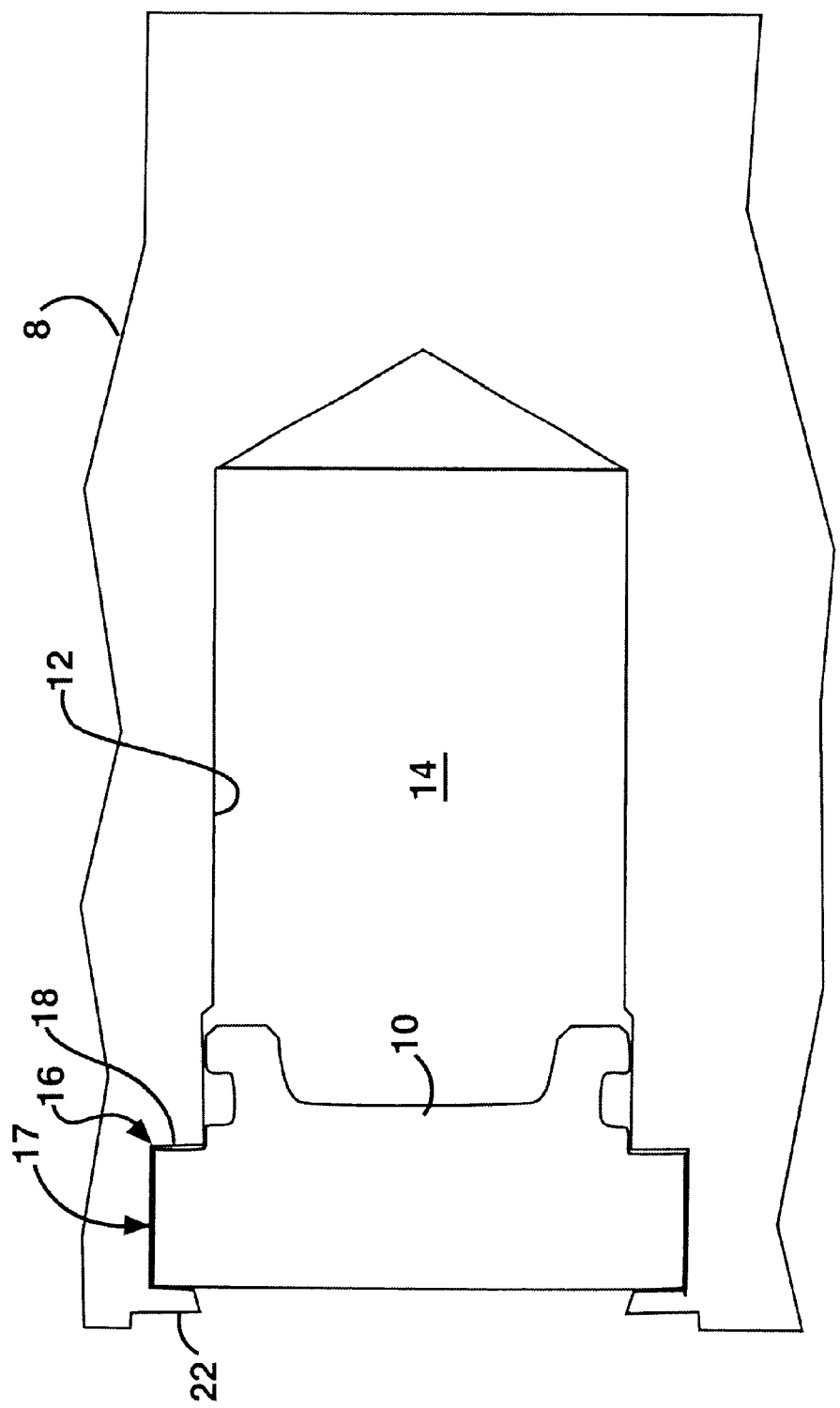
FIG. 1 illustrates a cross-section of a prior art attenuator cap in a hydraulic control unit housing.
Figure 2:
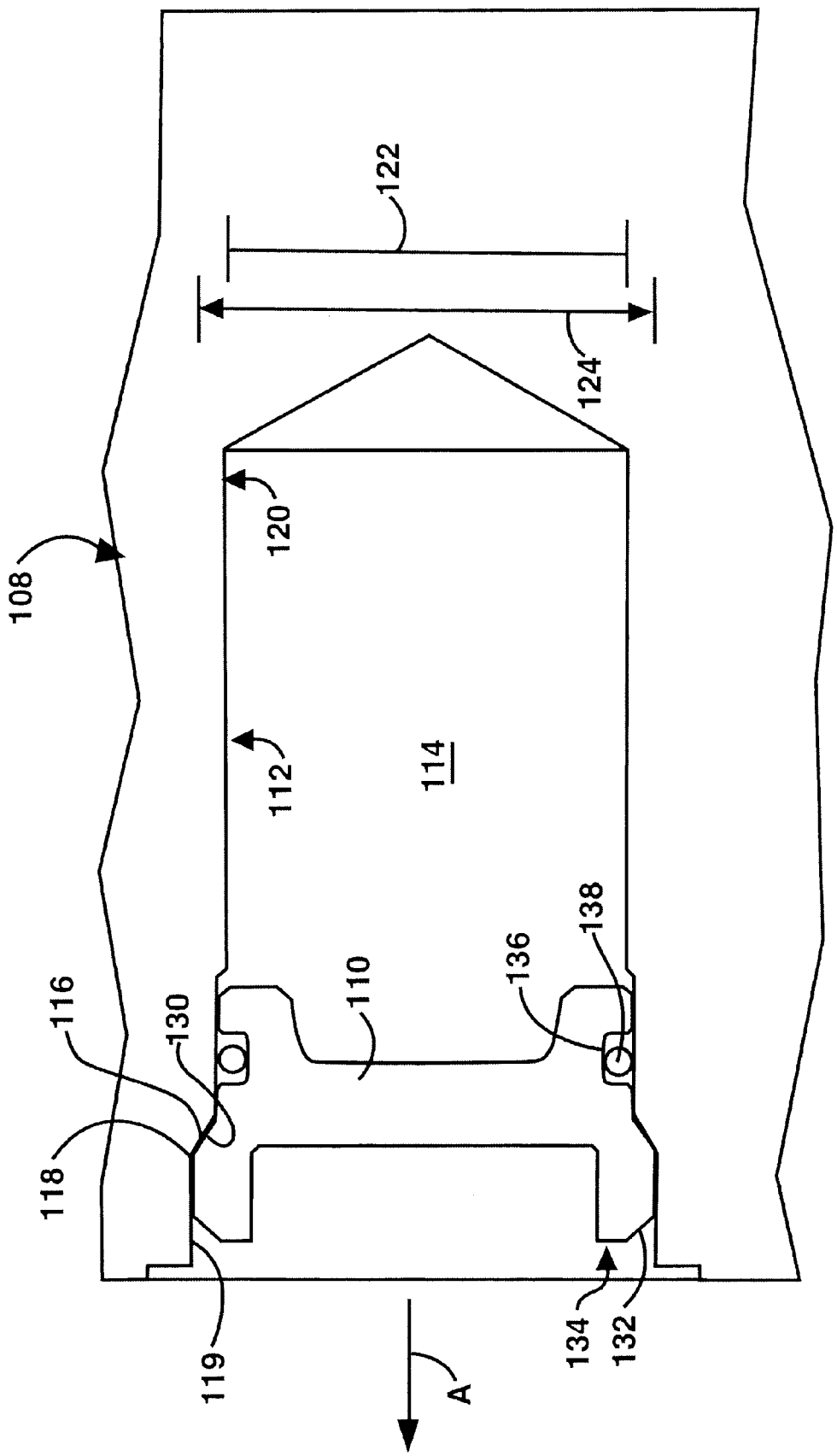
FIG. 2 illustrates a cross-section of one embodiment of a component positioned within a bore of a hydraulic control unit housing.
Figure 3:
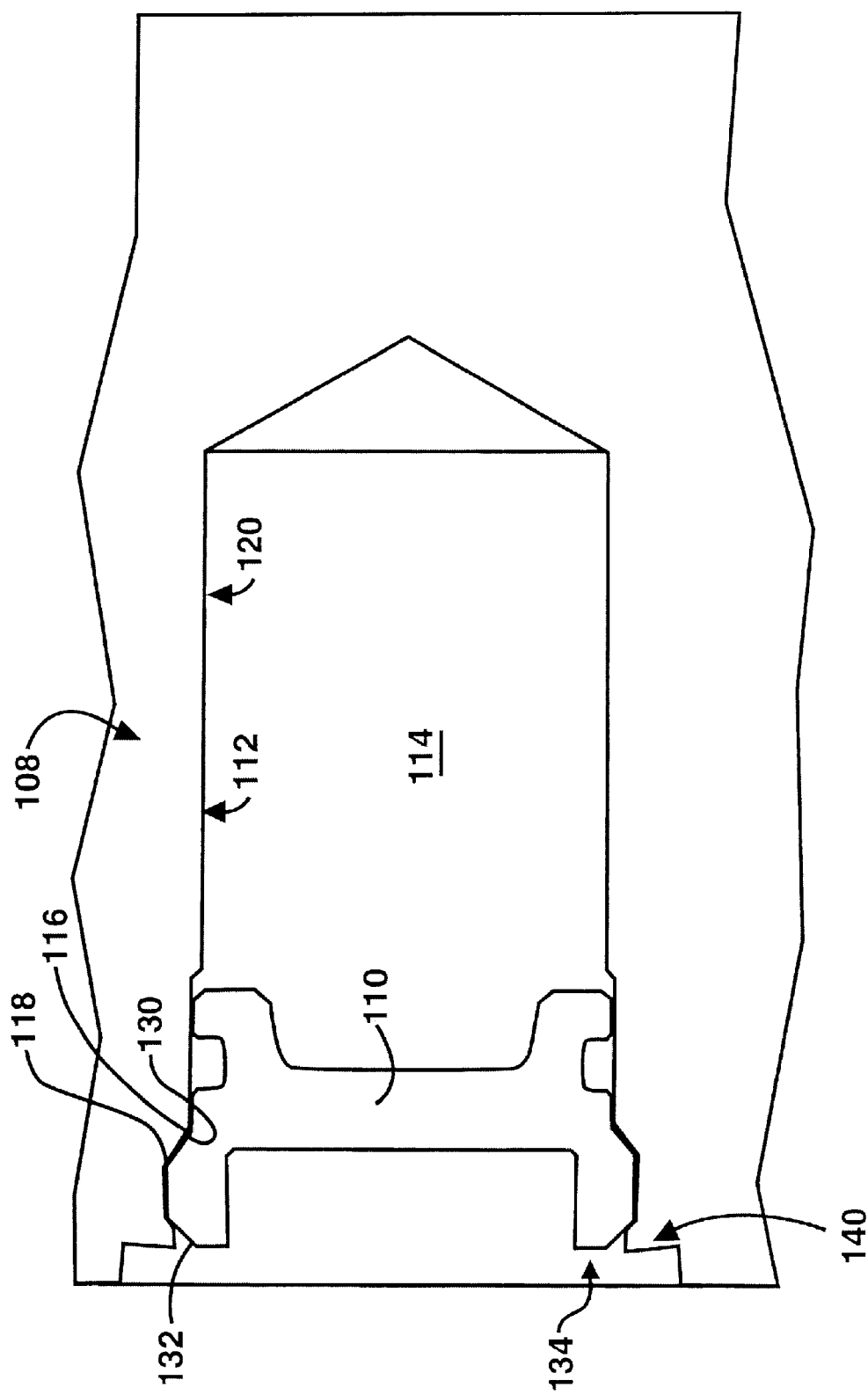
FIG. 3 illustrates a cross-section of the component and housing shown in FIG. 2 after the being staked.

Referring to FIGS. 2 and 3, component 110 can be positioned within bore 112 of housing 108. Bore 112 can be an opening, passage or space adapted to receive a component 110 as described herein. Component 110, when positioned in the bore 112 together define chamber 114. Chamber 114 is in fluid communication with a pressure source (not shown) and a brake assembly (not shown), or the like.

The housing 108 of the hydraulic control unit may contain a plurality of openings or bores 112, an isolated one of which is illustrated herein. The opening 112 includes a bottom portion 120 with a first diameter 122. Adjacent the component 110, the opening can include a second diameter 124, which is greater than the first diameter 122. A tapered land or region, which is an angled lead in or positive-stop 116, can be located between the first diameter portion 122 of the opening 112 and the second diameter portion 124 of the opening. The angled stop 116 can be angled about 30 degrees away from the axial direction A. It will be understood that the angle of region 116 may be from about 25 to 35 degrees. In other words, the diameter of the bore 112 narrows from an outside portion 119 to an inner portion 120 at region 116.

Component 110 includes an inner portion 130. In one embodiment, the angle of inner portion or face 130 is oriented at a steeper angle that the region 116 such that the face 130 and region 116 contact at a single point 118. It will be understood that the point 118 is a point in cross section and actually describes a ring shaped contact point 118. In this manner, the component can be positioned accurately within the bore 112 and maintained at a precise stack height within the housing 108. Further, the direct contact between portion 130 of the cap 110 and angled stop 116 ensures a successful stake.

The component 110 can include an outer portion or face 132, which is oriented from the axial direction A at an angle of about 45 degrees. The outer portion 132 can be an annular face formed in the component 110 adjacent the outer end 134 of the component 110 (outer being relative to the position of the end of the component as positioned and seated in the housing).

Groove or channel 136 can be formed about a peripheral portion of the component 110. Seal 138, which can be an O-ring, is positioned in the channel, in contact with the bore 112 to seal fluid in the chamber 114.

The component 110 is shown in FIG. 2 before being secured in the housing. Referring to FIG. 3, component 110 is shown after the housing 108 has been modified to secure the component within opening 112. The preferred process of modifying the housing 108 is referred to as "staking". Staking involves applying a "stake tool" to the housing 108 causing the housing material at portion 140 surrounding the upper portion 119 of opening 120 to deform inwardly and over the component 110. This narrows the diameter of the opening 112 adjacent portion 132 and forms an inwardly oriented ring-shaped zone of material 140 that prevents component 110 from being dislodged from seat 118. Thus, component 110 is secured within bore 120. It can be seen that due to deforming housing 108 at area 119, no clips or other retaining devices are necessary, the position of cap 110 is accurately assured and a relatively narrow bore is required for housing and securing the component. Thus, assembly of component 110 into housing 108 is simplified without the need for complex machining operations or additional devices.

The method of securing the component 110 into housing 108 includes inserting component 110 into an opening or bore 112. An inner portion of component 110 is contacted to an angled stop region 118 of the housing 108 of the hydraulic control unit. A retaining portion 140 of the hydraulic control unit housing 108 is deformed. An outer portion 132 of the component 110 is contacted with the retaining portion 140 of the hydraulic control unit housing 108 and component 110 is secured thereby.

Figure 4:
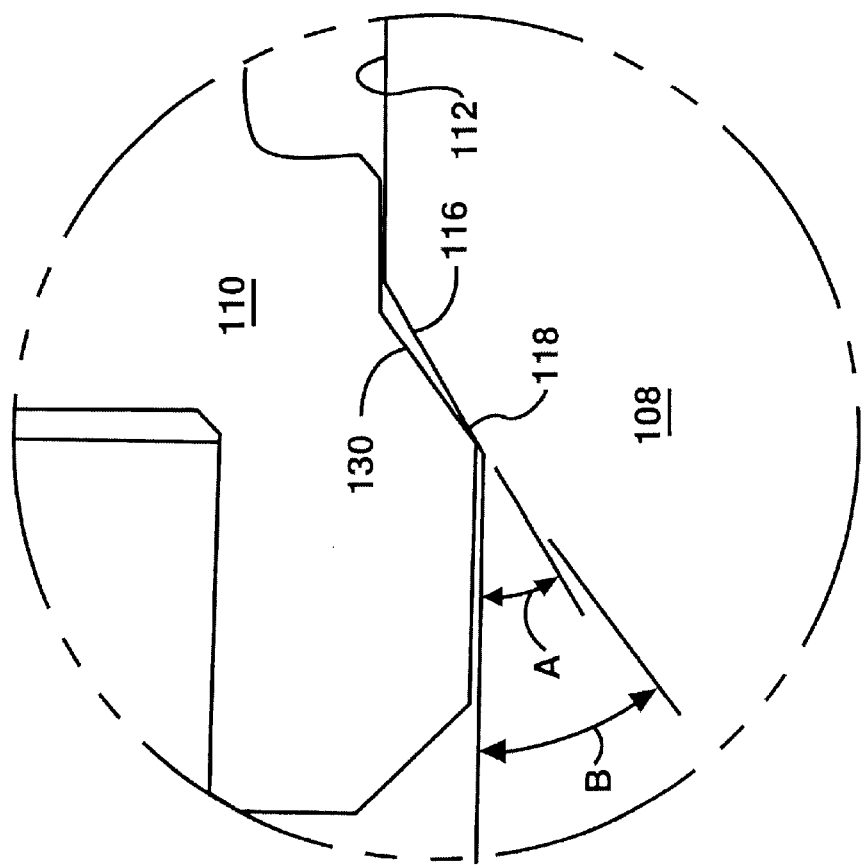
FIG. 4 is an enlarged portion of FIG. 3.

Referring to FIG. 4, an illustration of the fit or cooperation between component 110 and body 108 is shown. In particular, the inner portion 130 is formed on the cap 110 at an angle B only slightly different than that of the angled portion 116 of the bore 112. For example, if the angle A of the portion 118 of the bore is 35 degrees, the angle of the portion 130 of cap 110 is formed an additional 1 or 2 degrees, or any suitable amount of degrees with respect to the axial direction. In this manner, the contact point 118 securely establishes the position of the cap in the bore.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system for retaining a component in a hydraulic control unit comprising;
   a housing including an opening formed therein and a retaining portion adjacent the opening, the housing having an angled region formed within a bore of the opening; and
   a component including an inner portion formed to contact the angled region at a single point and an outer portion to contact the retaining portion of the housing when the retaining portion is deformed over the outer portion.

2. The system of claim 1 wherein at least half of the outer portion is in direct contact with the retaining portion of the housing when the retaining portion is deformed.

3. The system of claim 2 wherein a peripheral groove is formed on the component adapted to receive an O-ring.

4. The system of claim 1 wherein the inner portion of the component is formed at an angle between about 25 to 35 degrees.

5. The system of claim 1 wherein the outer portion of the component is formed at an angle between about 35 to 55 degrees.

6. A device for retaining pressurized fluid within a hydraulic control unit comprising;
   a body portion;
   an inner portion contoured to contact an angled portion of the hydraulic control unit at a single point; and
   an outer portion contoured to contact an integral retaining portion of the hydraulic control unit.

7. The device of claim 6 wherein at least half of the outer portion is in direct contact with the integral retaining portion of the hydraulic control unit.

8. The device of claim 6 wherein a groove is formed about the periphery of the body portion, the groove adapted to receive an O-ring.

9. The device of claim 6 wherein the inner portion of the component is formed at an angle between about 25 to 35 degrees.

10. The device of claim 6 wherein the outer portion of the component is formed at an angle between about 35 to 55 degrees.

11. A method of retaining a component within a hydraulic control unit comprising;
    inserting a component into an opening of the hydraulic control unit;
    contacting an inner portion of a component to an angled region of the hydraulic control unit at a single point;
    deforming a retaining portion of the hydraulic control unit; and
    contacting an outer portion of the component with the retaining portion of the hydraulic control unit.

12. The method of claim 11 wherein inserting the component into the opening of the hydraulic control unit comprises an angled lead-in to orient the component in relation to the opening at a predetermined stack height.

13. The method of claim 11 wherein contacting the inner portion of the component to the stop region of the hydraulic control unit comprises preventing the component from positioning further within the hydraulic control unit.

14. The method of claim 11 wherein deforming the retaining portion of the hydraulic control unit comprises compressing a portion of the hydraulic control unit.

15. The method of claim 11 wherein contacting an outer portion of the component with the retaining portion of the hydraulic control unit comprises staking a portion of the hydraulic control unit in order to secure the component.

16. A system for retaining a component comprising:
    means for inserting a component into an opening of an hydraulic control unit;
    means for contacting an inner portion of a component to an angled region of the hydraulic control unit at a single point; and
    means for deforming a retaining portion of the hydraulic control unit to contact an outer portion of the component with the retaining portion of the hydraulic control unit.

17. The system of claim 16 wherein the means for inserting the component into the opening of the hydraulic control unit comprises an angled lead-in to orient the component in relation to the opening at a predetermined stack height.

18. The system of claim 16 wherein the means for contacting the inner portion of the component to the stop region of the hydraulic control unit comprises preventing the component from positioning further within the hydraulic control unit.

19. The system of claim 16 wherein the means for deforming the retaining portion of the hydraulic control unit comprises compressing a portion of the hydraulic control unit.

20. The system of claim 16 wherein the means for contacting an outer portion of the component with the retaining portion of the hydraulic control unit comprises staking a portion of the hydraulic control unit in order to secure the component.

* * * * *